United States Patent [19]

Yoshio

[11] Patent Number: 4,970,602
[45] Date of Patent: Nov. 13, 1990

[54] DISK PLAYER FOR DISPLAYING RECORDED AUDIO SIGNALS

[75] Inventor: Junichi Yoshio, Saitama, Japan

[73] Assignee: Pioneer Electronic Corporation, Tokyo, Japan

[21] Appl. No.: 243,958

[22] Filed: Sep. 14, 1988

[30] Foreign Application Priority Data

Feb. 12, 1988 [JP] Japan .................. 63-31170

[51] Int. Cl.⁵ .............................................. H04N 5/91
[52] U.S. Cl. ..................... 358/341; 358/342; 358/139
[58] Field of Search ............. 360/38.1, 32, 13, 14.1, 360/14.2, 14.3, 19; 358/310, 341, 343, 81, 82, 139, 342

[56] References Cited

U.S. PATENT DOCUMENTS

| | | | |
|---|---|---|---|
| 4,081,829 | 3/1978 | Brown | 358/82 |
| 4,149,188 | 4/1979 | Nagai | 358/139 |
| 4,168,508 | 9/1979 | Gilbert | 358/82 |
| 4,176,375 | 11/1979 | Scarpelli | 358/82 |
| 4,267,561 | 5/1981 | Karpinsky et al. | 358/82 |
| 4,435,734 | 3/1984 | Hedberg et al. | 360/20 |
| 4,446,490 | 5/1984 | Hoshimi et al. | 360/32 |
| 4,453,280 | 6/1984 | Hoshimi et al. | 360/38.1 |
| 4,648,113 | 3/1987 | Horn et al. | 358/82 |
| 4,652,919 | 3/1987 | Devino | 358/82 |
| 4,670,796 | 6/1987 | Kobayashi et al. | 358/310 |
| 4,768,086 | 8/1988 | Paist | 358/81 |

OTHER PUBLICATIONS

Gooze et al., "Converting Digital Data into Color Television Graphics", *Electronics*, Jan. 18, 1979, pp. 124–128.

*Primary Examiner*—Donald McElheny, Jr.
*Attorney, Agent, or Firm*—Sughrue, Mion, Zinn, Macpeak & Seas

[57] ABSTRACT

A disk player for a disk having video signals and digital audio signals recorded thereon. The disk player includes a video reproducing system for reproducing video signals recorded on the disk, an audio reproducing system for reproducing digital audio signals recorded on the disk as analog audio signals, and a processing circuit for converting the digital audio signals into a video signal so that the audio signals recorded on the disk can be displayed.

10 Claims, 2 Drawing Sheets

4,970,602

DISK PLAYER FOR DISPLAYING RECORDED AUDIO SIGNALS

FIELD OF THE INVENTION

This invention relates to a disk player which can play LDs, CDs and CDVs, or to a disk player which can play CDs and CDVs.

BACKGROUND OF THE INVENTION

In disk players of these types, a video signal is read from a disk and then displayed on a monitor, whereas a digital audio signal read from the disk is subjected to D/A (digital-to-analog) conversion for outputting an analog audio signal. Further, data such as time, chapter and TNO which are recorded on the disk, are decoded so that they can be superimposed as character displays on the monitor.

On the other hand, the CD format has a sub-code data region. If digital picture graphs or sentences of character data are recorded in the sub-code data region, then they can be decoded so as to be displayed on the monitor.

Thus, in playing a compact disk with a disk player capable of playing LDs, CDs and CDVs or with a disk player capable of playing CDs and CDVs, characters such as time data can be displayed on the monitor in the system, or still pictures of image data previously stored in memory can be displayed on the monitor. Furthermore, in the case where sub-codes have been recorded on the compact disk, then digital graphs or characters of the sub-codes can be displayed.

However, in an audio reproduction with a compact disk having no sub-codes, nothing can be displayed on the monitor, or a meaningless still picture can be displayed; that is, it cannot be said that the disk player is sufficiently utilized.

SUMMARY OF THE INVENTION

In view of the foregoing, the present invention has been developed. The present invention provides a signal processing system, which, during audio reproduction, a signal processing operation is carried out with image data representing the circuit characteristics of the audio data reproducing system as a video output, whereby the monitor is efficiently used. According to the present invention, during audio reproduction, the power level of the audio signal is displayed on a television monitor over the frequency band of the audio signal. Additionally, audio signal levels for right and left channels, and the frequency characteristics of the equalizer may be displayed.

This invention is based on the fact that audio signals outputted by a decoder are digital data, and is intended to provide a disk player with the feature of displaying musical waveforms on a television monitor (e.g., of a NTSC system) similar to the case of an oscilloscope.

According to the present invention, a disk player includes a signal processing means which, in playing a disk having audio data, uses the audio data as an output of a video data reproducing system. The signal processing means is designed so that a digital audio signal outputted by a decoder is divided into frames with an interval therebetween, if necessary. The frames are sampled for each of the pictures handled by the video data reproducing system.

PREFERRED EMBODIMENT OF THE INVENTION

One embodiment of the invention will now be described with reference to the accompanying drawings.

Figure 1:
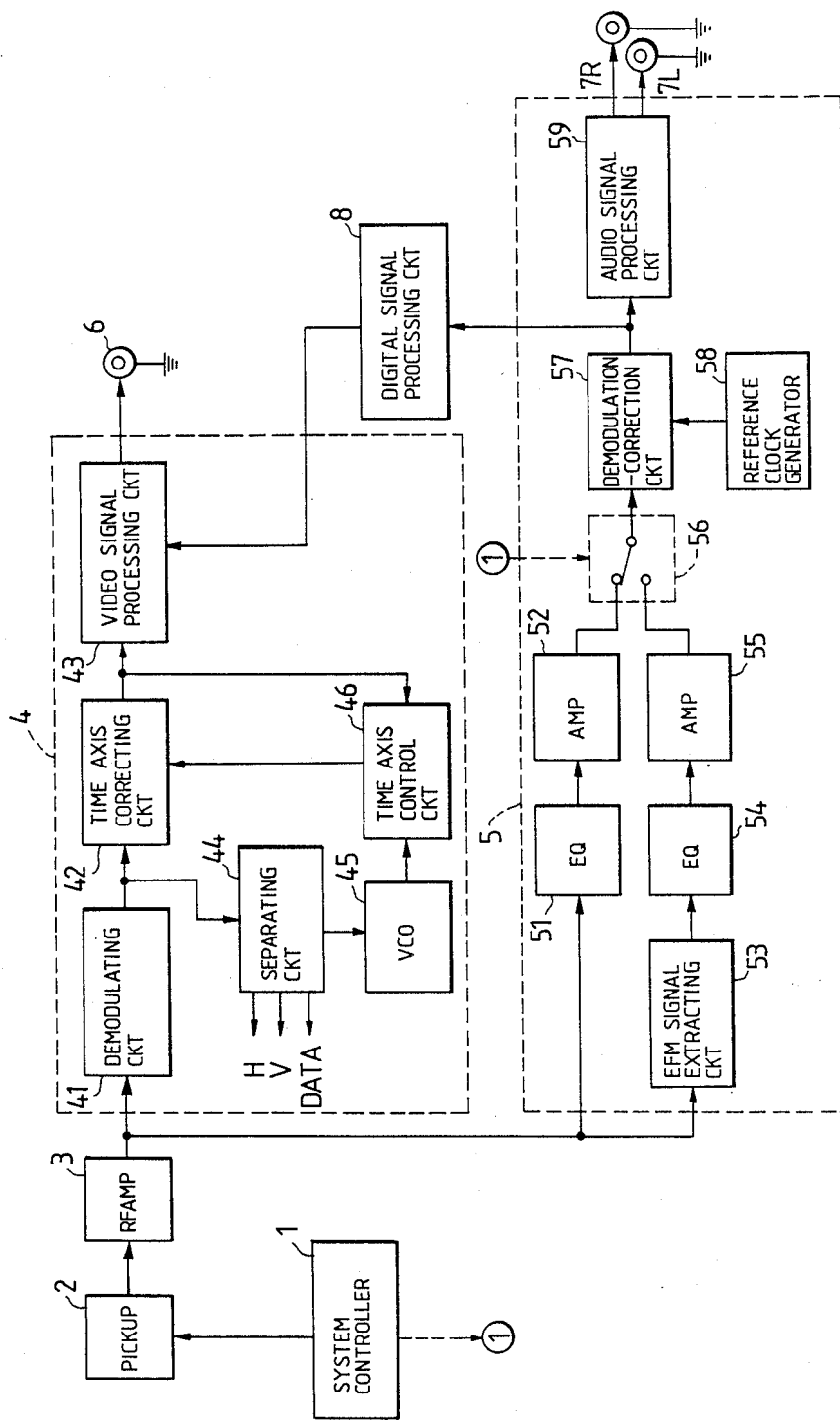
FIG. 1 is a block diagram showing one embodiment of the invention.

As shown in FIG. 1, a signal from a system controller 1 is used to drive a tracking actuator or focus actuator (not shown) so that a RF signal is read with a pickup 2. The RF signal thus read is applied through a RF amplifier 3 to a video data demodulating system 4 and to a digital data demodulating system 5.

In the video data demodulating system 4, the RF signal is demodulated into a video signal by demodulating circuit 41, and the video signal is applied through a time axis correcting circuit 42 to a video signal processing circuit 43. The horizontal synchronizing signal, vertical synchronizing signal, and control data included in the video signal outputted by the demodulating circuit 41, are extracted and separated by a separating circuit 44. In synchronization, for instance, with the extracted horizontal synchronizing signal, a local oscillator (e.g., a voltage-controlled oscillator (VCO)) 45 provides an oscillation output and a frequency division signal. A time axis control circuit 46 receives the oscillation output and the frequency division output, and the horizontal synchronizing signal and the color burst signal contained in the video signal provided by the time axis correcting circuit 42 are compared to obtain the phase difference thereof. As a result of this comparison, the time axis control circuit applies a control signal, corresponding to the phase difference, to the time axis correcting circuit 2 to thereby subject the video signal to time axis correction. The time axis corrected video signal is applied through the video signal processing circuit 43 to a video output terminal 6.

The video signal processing circuit 43 carries out a video muting operation of inhibiting the outputting of a video signal, an operation of superimposing character data provided by a character generator, and an operation of inserting images according to image data.

Since it is necessary to process a PCM audio signal separately according to a CD region and a video region, the digital data demodulating system 5 includes an equalizer circuit 51 and an amplifier 52 for CD regions, and an EFM signal extracting circuit 53, an equalizer circuit 54 and an amplifier 55 for video regions. The digital data demodulation system 5 further includes a select switch 56 for selecting between either a first system consisting of the equalizer circuit 51 and the amplifier 52, or a second system consisting of the EFM signal extracting circuit 53, the equalizer circuit 54 and the amplifier 55. A change-over instruction is applied to the select switch 56 by the system controller 1.

The reason why the two systems are employed is that if, in the recording operation, the digital signal is superposed on the FM-modulating video signal as it is, then the EFM signal will adversely affect the low frequency components of the FM video signal, and therefore the recording operation is carried out under the conditions that the EFM signal is lower by several tens of decibels (dB) than the carrier although they are equal in modulation degree. In other words, an EFM signal for a CD region and an EFM signal for a video region are different in frequency characteristic and in amplitude when reproduced, even if they are the same signal and accordingly it is necessary to provide different systems to process them.

In a CD region reproduction, the reproduced RF signal is an EFM signal, and it is compensated in frequency characteristic by the equalizer circuit 51 having a predetermined equalizing characteristic, and the compensated signal is amplified with a predetermined gain by the amplifier 52. On the other hand, in a video region reproduction, only an EFM signal included together with an FM video signal in the reproduced RF signal is extracted by the EFM signal extracting circuit 53 having a low pass filter and it is compensated in frequency characteristic by the equalizer circuit 54 having an equalizing characteristic which is different from that of the equalizer circuit 51, and it is amplified at a large gain by the amplifier 55.

Thus, in the video region reproduction, the EFM signal obtained has a frequency characteristic and an amplitude which are substantially equal to those of the EFM signal obtained in the CD region reproduction.

The reproduced EFM signal is subjected to EFM demodulation by a demodulation-correction circuit 57, and then written in a memory such as a RAM. The signal written into the RAM is used for a de-interleaving operation through the transmission of data to and from the RAM in response to a clock signal from a reference clock generator 58, and a parity check using parity in the data. The binary 16-bit digital audio signal thus demodulated and corrected is processed by an audio signal processing circuit 59 comprising a D/A converter and a deglitcher circuit, and then applied to audio output terminals 7R and 7L.

Figure 2:
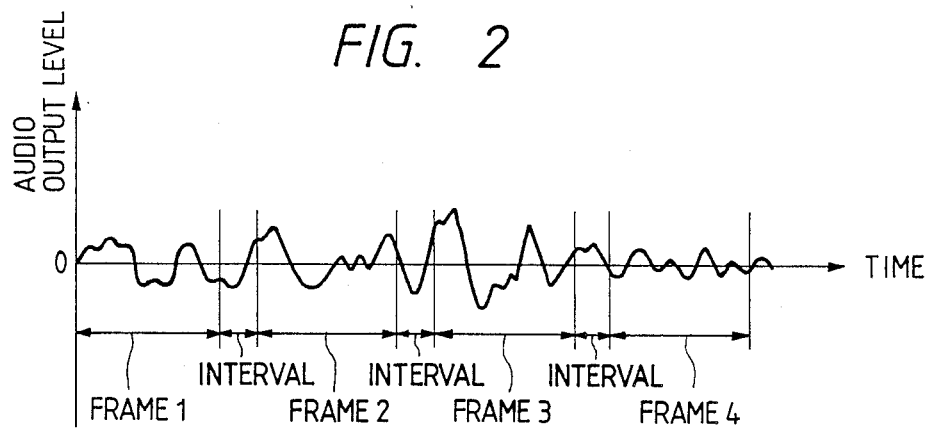
FIG. 2 is a time chart showing a sampling operation of an audio output so that the audio output is displayed as a picture for frames with an interval therebetween.
Figure 3:
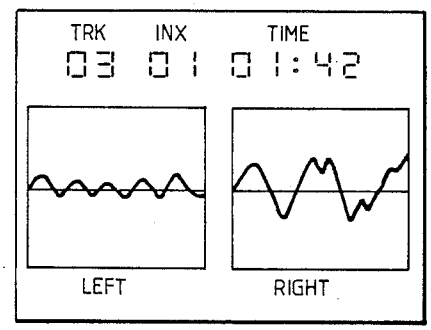
FIG. 3 is an explanatory diagram showing a display on a television monitor.
Figure 4:
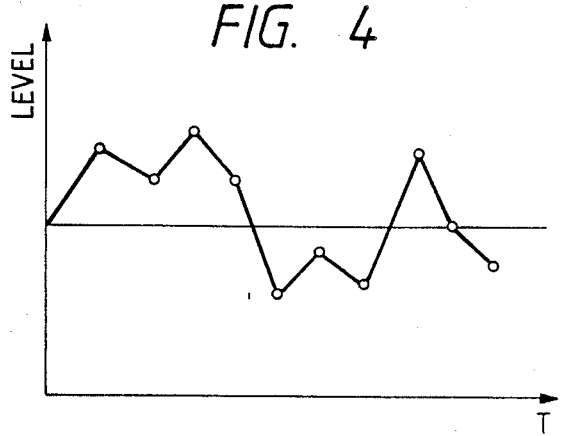
FIG. 4 is a graphical representation indicating the sampling data of frame (1) in FIG. 2.

The above-described audio signal is further applied to a digital signal processing section 8, where it is processed to provide audio output waveforms for right and left channels with the horizontal axis as a time axis on the monitor (See FIG. 3). Video data obtained by conversion of the digital audio signal together with other ordinary data such as time data, chapter and TNO is laid out when necessary, and supplied, as a video signal, to the video signal processing circuit. The above-described video data is obtained as follows: The audio signal is divided into frames, with an interval (determined from a processing time) therebetween, when necessary, and the frames are sampled according to a picture handled in the video reproduction system (See FIG. 2). For instance in the case where, in sampling data at 44.1 KHz, one sample is extracted every 100 sampling operations, and 100 samples extracted from one picture, thus providing an audio output waveform, renewal for the picture takes 0.23 sec=(1/C 44.1×$10^3$)×100×100. Renewal for the waveform display at a speed of this order is effective in displaying waveforms on the monitor, and the merit in waveform observation of a digital oscilloscope can be confirmed on the monitor.

The waveforms for right and left channels may be displayed with time on the monitor as shown in FIG. 3, however, the waveforms may be displayed over the time access in such a manner that they overlap each other, or they may be displayed as Lissajous figures for right and left channels. In this case, an effect on measurement or on entertainment can be expected.

As was described above, according to the invention, the signal processing means is so designed that, in converting a digital audio signal into video data, the digital audio signal is sampled with an arbitrary period and displayed in correspondence with an optional picture handled by the video data reproducing system. Therefore, in the CD reproduction, the video monitor which converts video signals into pictures can display musical waveforms as in the case of an oscilloscope.

I claim:

1. A disk player for disks having at least one of a video signal and digital data representing an audio signal recorded thereon, the disk player comprising:
    a video reproducing system for receiving and for reproducing the video signal recorded on a disk;
    an audio reproducing system, connected to receive the recorded digital data representing an audio signal, for converting the received digital data to an audio signal; and
    a digital processing circuit, also connected to receive the recorded digital data representing an audio signal, for converting the received digital data into a video signal, thereby outputting a video-converted digital audio signal, and supplying the video-converted digital audio signal to said video reproducing system so that the video-converted digital audio signal can be displayed.

2. The disk player according to claim 1, wherein said audio reproducing system includes a first system for processing digital data representing an audio signal recorded on a CD region of a disk, and a second system for processing digital data representing an audio signal recorded on a video region of the disk, and means for selectively supplying the outputs of said first and second systems to said processing circuit.

3. The disk player according to claim 1, wherein said digital processing circuit includes means for dividing the video-converted digital audio signal into frames, and means for synchronously sampling the frames according to a picture being reproduced in said video reproducing system.

4. The disk player according to claim 1, wherein said video reproducing system includes a demodulating circuit for receiving the video signal recorded on a disk, a time axis correction circuit connected to receive an output of said demodulating circuit, and a video signal processing circuit connected to receive an output of said time axis correction circuit.

5. The disk player according to claim 4, wherein said video reproducing system further includes:
    a separating circuit connected to receive an output of said demodulating circuit,
    a voltage-controlled oscillator connected to receive an output of said separating circuit, and
    a time axis control circuit, connected to receive an output from said time axis correction circuit and an output from said voltage-controlled oscillator, for supplying a control signal to said time axis control circuit in response to the outputs from said time axis correction circuit and said voltage-controlled oscillator.

6. The disk player according to claim 1, wherein said audio reproducing system includes first equalizer circuit means having first equalizing characteristics, a second equalizer circuit means having second equalizing characteristics, which are different from the first equalizing characteristics, select switch means for selectively supplying an output of only one of said first and second equalizer circuit means, a demodulation-correction circuit connected to receive the output supplied by said select switch means, and an audio signal processing circuit for receiving an output of said demodulation-correction circuit.

7. The disk player according to claim 6, wherein said digital processing circuit is also connected to receive the output of said demodulation-correction circuit.

8. The disk player according to claim 6, wherein said audio signal processing circuit includes a digital-to-analog converter.

9. The disk player according to claim 6, wherein said audio reproducing system further includes a digital data extracting circuit for receiving a recorded video signal containing the digital data representing an audio signal, and for extracting the digital data therefrom, said second equalizer circuit means connected to receive an output of said digital data extracting circuit.

10. The disk player according to claim 6, wherein said first and second equalizer circuit means each comprises an equalizer circuit and an amplifier connected to said equalizer circuit.

* * * * *